INVENTORS
JOHN W. DAIBER
ABRAHAM HERTZBERG
CHARLES E. WITTLIFF

Jan. 13, 1970  J. W. DAIBER ET AL  3,489,645
METHOD OF CREATING A CONTROLLED NUCLEAR FUSION REACTION
Filed March 10, 1967  5 Sheets-Sheet 2

INVENTORS
JOHN W. DAIBER
BY ABRAHAM HERTZBERG
CHARLES E. WITTLIFF

AGENT

INVENTOR
JOHN W. DAIBER
ABRAHAM HERTZBERG
CHARLES E. WITTLIFF

United States Patent Office 3,489,645
Patented Jan. 13, 1970

3,489,645
METHOD OF CREATING A CONTROLLED NUCLEAR FUSION REACTION
John W. Daiber, Williamsville, and Charles E. Wittliff, Clarence, N.Y., and Abraham Hertzberg, Bellevue, Wash., assignors to Cornell Aeronautical Laboratory, Inc., Buffalo, N.Y., a corporation of New York
Continuation-in-part of application Ser. No. 540,363, Apr. 5, 1966. This application Mar. 10, 1967, Ser. No. 633,330
Int. Cl. G21b 1/00
U.S. Cl. 176—1
4 Claims

ABSTRACT OF THE DISCLOSURE

An evacuated chamber, a drop of fusion fuel at the center of the chamber, lasers surrounding the chamber and focussed at the fuel drop, some of which being fired at a low energy level sufficient to cause a spherical blast wave emanating from the center of the fuel drop, the other lasers being fired at a high energy level just as the blast wave leaves the confines of the fuel drop creating a strong imploding compression wave producing thermonuclear energies.

CROSS-REFERENCE TO RELATED APPLICATION

The present application is a continuation-in-part of application Ser. No. 540,363 filed Apr. 5, 1966 and assigned to the assignee of the present application, now abandoned.

BACKGROUND OF THE INVENTION

The present invention relates to the field of controlled nuclear fusion reactions.

As is well-known to those skilled in the art, the key ingredients of the nuclear fusion process are the nuclei of certain very light elements—those existing at the low end of the periodic table. The reason why these elements are suitable is because of their low nuclear charge and binding energy as will be discussed hereinbelow.

The element having the lowest atomic number is hydrogen with its two other isotopes, deuterium and tritium. Because of its low fusion reaction rate, hydrogen itself is not suitable for practical fusion reactions even though it is more abundant in nature than the other two. Deuterium occurs in nature with an abundance of about one part in six thousand of hydrogen. Deuterium, therefore, as a fuel for fusion reactions presents an almost limitless source of energy. Tritium, a radioactive isotope, must be manufactured. Thus, long after chemical fuels and fission fuels have been exhausted, there will still be an abundance of nuclear fusion fuels. In fact, it has been estimated that there is enough deuterium on earth to provide a source of energy for some twenty thousand million years. It is apparent, therefore, that the above has sufficiently demonstrated the importance of controlling nuclear fusion reactions such that net energy outputs are achieved.

Whereas, the nuclear fission reaction is basically one of nuclei splitting accompanied by the release of energy, the fusion reaction is basically one of nuclein joining or coalescing accompanied by the release of energy. At the conditions necessary for this joining to occur, the gaseous fuel is dissociated and ionized into a plasma form wherein the nuclei are stripped of their negatively charged electrons. After this ionization, the stripped nuclei have a net positive charge and therefore normally repel one another. Before fusion can occur the repulsion force between the nuclei must be overcome. The element with the lowest charge is the one having the lowest atomic weight, hydrogen. This is why hydrogen and its isotopes make the best fusion fuel. In order to overcome the repulsive forces existing between the nuclei, they must be made to collide at very high velocities. Even then, however, there is a greater possibility that the colliding nuclei will not fuse but will, instead, rebound elastically. The nuclei must, therefore, be confined in a region where they can approach each other, time and time again, until fusion will eventually take place. Temperatures necessary for these collisions to be fast enough for the fusion reaction to produce more energy than these nuclei particles lose by radiation are on the order of $10^8$ degrees Kelvin. This temperature represents a threshold value only and must be maintained to enable fusion reaction to continue. This is because of energy losses which take place concurrently with the addition of heat energy. Two of the most important of these losses are those caused by radiation from the hydrogen nuclei and also from contaminants and runaway particle instabilities. Thus, the critical temperature for a sustained reaction has to be higher than that to initiate fusion.

In addition to the critical temperature requirement is the necessity of confining the hot plasma for a long enough time such that an appreciable fraction of the nuclei may fuse. Solid chamber walls cannot be used for confinement since the collision of the plasma particles therewith result, inter alia, in cooling of the particles with subsequent quenching of the reaction. Even with certain other type "walls" to be discussed hereinbelow, it would only be a matter of time before the particles start to break out of their confinement, taking away valuable energy with them.

Up to the present time, all feasible methods of containing the plasma have relied on one form or other of magnetic confinement means. This involves the use of magnetic fields which in effect exert a confining pressure of the charged particles on the plasma. These devices have the requirement in common that the plasma density be low. The reason for this is that the magnetic "walls" are not strong enough to contain high density plasma. To reach criticalness at low densities a longer confinement time is necessary, since it is agreed by those skilled in the art that the product of density and confinement time must exceed a certain threshold value before the reaction can be sustained. With the prior art magnetic "walls" the longer the confinement time, the greater the energy losses due to runaway or break out particles and other instabilities as mentioned earlier. In fact, these losses are so high that heretofore it has not been feasible to develop a method whereby the total fusion energy release is greater than the total energy input necessary to start the reaction.

In addition to the above losses inherent in prior art methods there are also radiation losses resulting from contamination. Contamination may be defined as the presence of heavy nuclei particles in the confined plasma region. As is known, the bremsstrahlung radiation loss is, inter alia, a function of atomic weight. Thus heavy nuclei in the confined region are sources of increased radiation losses. With most of the prior art techniques the plasma is either produced outside of the confined reaction region and conveyed thereto or produced inside the confined region by an electric field. Contamination is likely to occur in each of these two methods, in the former by heavy particles picked up on the way to the reactor, whereas in the latter by ionization of the metallic electrodes which produce the electric field.

SUMMARY OF THE INVENTION

Basically, the present method relies on a high energy imploding compression wave (which under some conditions may be termed a shock wave) to contain the plasma, which compression wave is capable of containing plasmas at very high densities. The confinement time for a sustained reaction under these circumstances is greatly reduced; virtually eliminating the possibility of energy loss due to runaway particles as occurs with the prior art magnetic "walls." It is to be emphasized that the present method does not rely on any form of magnetic means to contain and compress the plasma.

The method according to the present invention provides for the steps of; energizing the central area of a body of fusion fuel at a first energy level such that an exploding shock wave emanates therefrom, and further energizing said fuel at a second energy level such that an imploding compression wave is created adjacent said exploding wave whereby a sustained nuclear fusion reaction occurs downstream of said imploding compression wave.

It is an object of the present invention to provide a practical method of creating a thermonuclear reaction whereby the total energy output is greater than the energy input.

It is a further object of the present invention to provide a method of creating a nuclear fusion reaction with a prefectly pure plasma.

BRIEF DESCRIPTION OF THE DRAWINGS

For a fuller understanding of the methods afforded by the present invention reference may be had to the following detailed description of the same taken in conjunction with the accompanying drawings wherein.

DESCRIPTION OF THE PREFERRED EMBODIMENT

Figure 1:
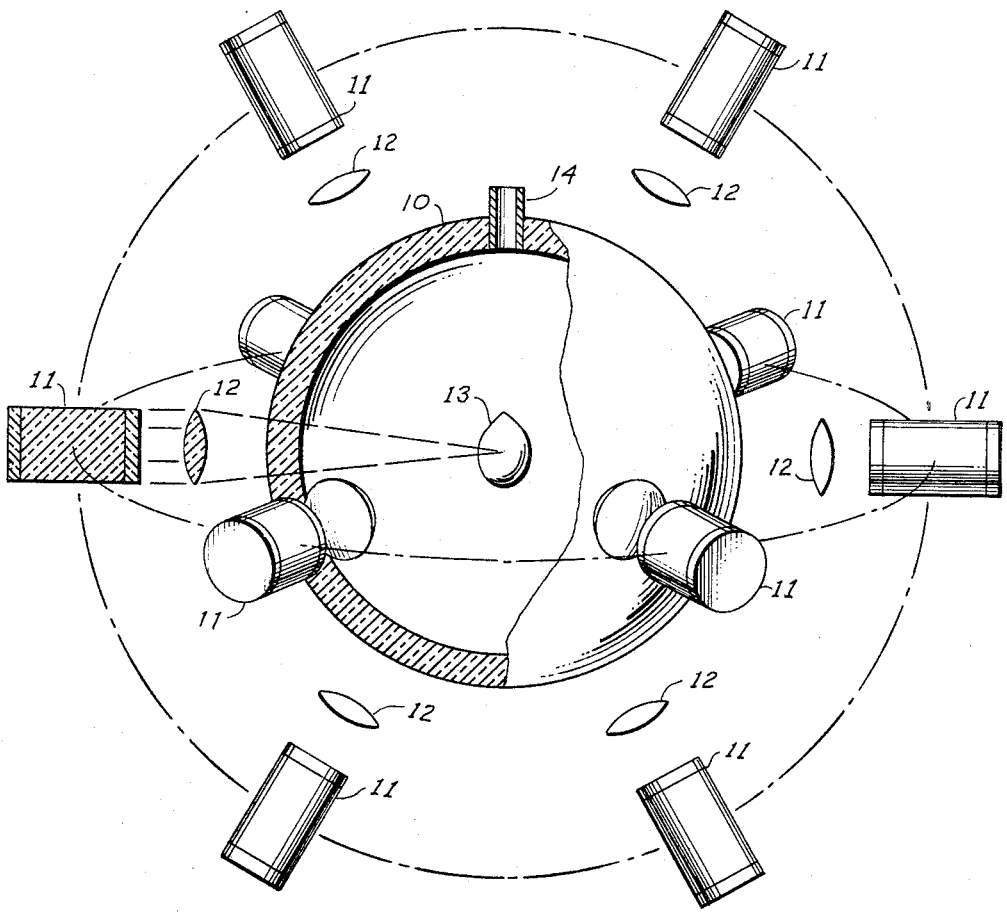
FIGURE 1 is a diagrammatic showing of a preferred arrangement for carrying out the principles of the present invention, and, FIGURE 1A is an enlarged fragmentary view of a portion of the apparatus shown in FIGURE 1.

Before referring to the drawings, a discussion follows of the underlying theory and laws governing the operation of the present method.

The use of lasers to heat a plasma to fusion-regime temperatures was first suggested by Basov and Dawson (see for example Physics of Fluids, vol. 7, page 981). These authors considered the direct heating of a small sphere of fluid by focused laser radiation. Both authors utilized energy conservation considerations to calculate the temperature and motion of the plasma during energy addition. They concluded that the maximum attainable temperature was limited by the rapid expansion of the sphere causing the plasma to become transparent at the laser frequency. It has been suggested that much higher temperatures could be achieved if the ordered mass motion of the expansion could be thermalized. Thermalization by magnetic field trapping has been postulated. However, this has been subject to the shortcomings noted supra for the magnetic "walls."

Direct heating of a fuel droplet by the above and other techniques have not been capable of leading to conditions that are conducive to thermonuclear reactions. In contrast to prior techniques, the present invention presents an implosion technique, whereby an appreciable fraction of the nuclei may fuse. As to be discussed in greater detail below, such an implosion is initiated by first creating an exploding blast wave which functions to shape the density and prepare the fuel to produce conditions conducive to the creating of an imploding shock wave.

If energy is added to only a small depth of the periphery of a spherical symmetric region, shock waves will emanate from both the inner and outer surfaces of this heated layer. If the heating is uniform over the surface, the shock wave formed on the interior becomes an imploding shock wave. As this wave implodes and reflects, it heats the interior gas plasma to high temperatures, greatly increasing the gas density and acts to thermalize the plasma.

The thermalization scheme presented here, as will be discussed in greater detail below, uses a large number of lasers focussed on a common point, so that the entire solid angle thereof is filled with radiation. These lasers must all be fired simultaneously, so that the heating will be sufficiently uniform to create a stable imploding shock wave.

If a plasma at the focal point is directly irradiated with this energy, most of the energy will appear as directed motion instead of thermal motion. In contrast to this, if the plasma is selectively heated in a thin symmetric shell, then the directed imploding motion will drive a strong shock wave.

In a plasma, laser radiation will be absorbed by the inverse Bremsstrahlung mechanism. The absorption coefficient in cm.$^{-1}$ is then $$(1) \quad k = \frac{4}{3}\left(\frac{2\pi}{3kT}\right)^{1/2} \frac{\eta i^2 Z^3 e^6}{hcm_e^{3/2}\nu^3}\left[1 - \exp\left(-\frac{h\nu}{kT}\right)\right]$$

where,
$k$ is Boltzmann constant, $1.38 \times 10^{-16}$ ergs/degrees K.
T is temperature,
$\eta_1$ s ion particle density, cm.$^{-3}$
Z is net ion charge
$e$ is electron charge, $4.8 \times 10^{-10}$ cm.$^{3/2}$ g.$^{1/2}$/sec.
$h$ is Planck constant, $6.63 \times 10^{-27}$ erg. sec.
$c$ is speed of light, $3 \times 10^{10}$ cm./sec.
$m_e$ is electron mass, $9.11 \times 10^{-28}$ g.
$\nu$ is frequency, Hz.
for z equal to 1, $\nu = 4.32 \times 10^{14}$ Hz.
and high temperatures, the absorption coefficient is $$(2) \quad k = 7.0 \times 10^7 \rho^2 T^{-3/2}$$

where $\rho$ is density, amagats.

Since the energy absorption depends on the square of the gas density, the radiant energy would be preferentially absorbed on the periphery of a sphere if the density could be increased on this periphery. Such shaping of the gas density is possible by using a weak exploding blast wave. If the lasers are first fired at an energy level sufficient to produce a breakdown at the center of the region, an exploding blast wave will be generated. As will be shown later, this blast wave produces, in effect, a high density shell of ionized gas.

The density variation behind a spherical blast wave can be expressed as $$(3) \quad \rho/\rho_1 = (r/r_0)^q$$

where $$(4) \quad q = 3(\rho_1/\rho_0 - 1)$$

Here $\rho_1$ is the density immediately behind the shock waves at radius $r_0$ and $\rho_0$ is the density ahead of the shock wave. The fractions of the mass contained from the origin out to the radius $r$ is $$(5) \quad \frac{mr}{mr_0} = \left(\frac{r}{r_0}\right)^{q+3}$$

For a shock wave compression ratio of 4, 90 percent of the mass is within 16.5 percent of the blast radius. Real-gas effects could make the density ratio across the shock wave as much as 10, in which case 90 percent of the mass is within 7.5 percent of the shock radius.

In such an ionized atmosphere, the laser energy will be preferentially absorbed immediately behind the exploding blast wave where the gas density is relatively high. Thus, peripheral heating will be achieved thereby producing a spherical imploding shock wave. The use of the laser to sculptor the plasma density is the crux of the thermalization technique according to the present invention.

The laser energy will be absorbed by the plasma behind the exploding blast wave providing the plasma is optically thick at the laser frequency and the reflection losses are small. The plasma will be optically thick as long as the bremsstrahlung mean-free-path at the laser frequency is less than the plasma thickness. If $d$ is the depth of the heat shell and $$(6) \quad \frac{1}{k} = \lambda_\nu = 2d$$

where $\lambda_\nu$ is photon mean-free-path at frequency $\nu$, cm.; then the maximum temperature to which the plasma can be heated becomes $$(7) \quad T_{max}^* = 2.7 \times 10^5 d^{2/3} \rho_1^{*4/3}$$

where the * (asterisk) refers to conditions after laser heating. The density $\rho_1^*$ is an average density in the heated region and is assumed to be constant during the laser heating.

Figure 3:
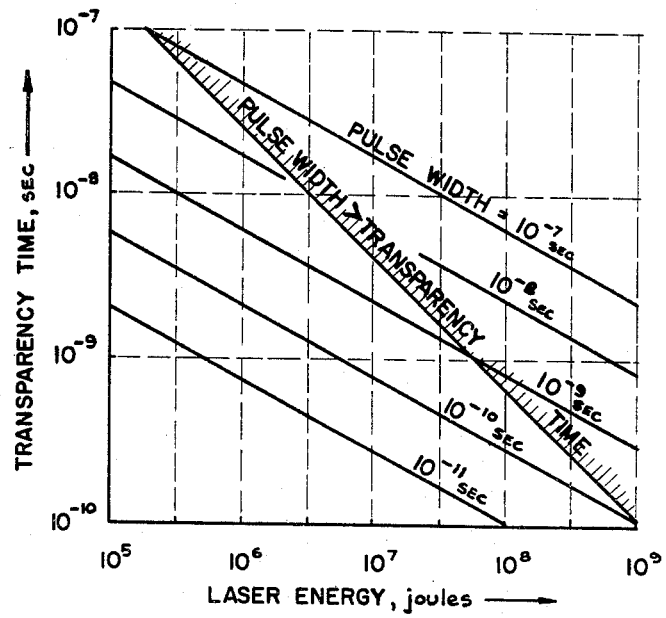
FIGURE 3 is a plot of available energy versus time.

The importance of the plasma expansion on the laser heating can be determined by the following relationship for a deuterium-tritium plasma $$(8) \quad t_t = 5.6 \times 10^{-3} \left(\frac{E_I}{t_q}\right)^{-4/9} \rho_1^{2/3} r_0^2$$

where $E_I$ is the laser energy, joules; $t_q$ is the laser pulse width, seconds; and $t_t$ is the time required for the plasma to become transparent. As long as the pulse width is small compared with the time for the plasma to become transparent, there will be no difficulty with the heating process. This relationship is plotted in FIGURE 3 for a plasma of 0.2 cm. initial radius ($r_0$) at 1500 amagats.

The electromagnetic energy generated by the laser can be absorbed by a plasma only if that radiation is not reflected by the plasma. Penetration into the plasmas of interest in the present gas is possible because gradients in electron density will exist on the plasma surface. These gradients will greatly reduce the plasma reflectivity for any value of the plasma frequency. The reduction in reflectivity into the surface gradients has been demonstrated both theoretically and experimentally. In the present technique, the gradients will be created by diffusion and motion of the heated plasma. Without such gradients the plasma would become highly reflecting when the plasma frequency corresponding to the electron density was greater than the signal frequency. For ruby-laser light at $4.32 \times 10^{14}$ Hz. This would correspond to a single ionized monatomic gas at 86 amagats. Since this limit can be exceeded when surface gradients are included, operation at substantially higher densities are possible.

As will be discussed hereinbelow, the exploding shock wave created by a low-energy firing of the lasers is used to shape the density distribution from that of a solid sphere to a shell in which most of the mass is concentrated on the periphery. The lasers will then be fired at very high energy and since the energy absorption process depends on the square of the gas density, the periphery will be preferentially heated. This heated region will drive shock waves in both the outward and inward direction. The inwardly propagating shock wave will become an imploding wave, amplifying the temperature as it accelerates toward the origin at the center of the sphere.

Referring now to the preferred embodiment there is shown at 10 in FIGURE 1 an evacuated container that is made of glass or any other suitable material that is transparent to a laser beam. Container 10 is preferably spherical in shape for ease in focusing the high energy coherent light beam as will become apparent hereinbelow.

Surrounding the container 10 are a plurality laser devices 11. The lasers are arranged so that upon firing thereof the entire solid angle of a small central volume about the origin of container 10 is filled with radiation. The lasers 11 can be of any well-known type, as for example, those utilizing ruby crystals. Intermediate the container 10 and the lasers 11 is a plurality of focusing lenses 12, which function to focus the laser beams at the center of spherical container 10. A drop of hydrogen or other suitable fusion fuel 13 which may be in the liquid or solid state is introduced into container 10 by means of a suitable conduit 14 arranged above the axis of container 10. Alternately, the hydrogen fuel drop may be injected from the bottom of the container by a jet of gaseous hydrogen, not shown. Many other ways of feeding the hydrogen into the container will be apparent to those skilled in the art.

Figure 1A:
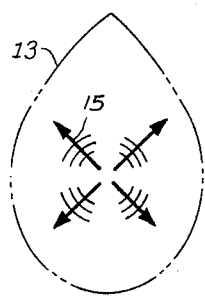
FIGURE 1B is another enlarged fragmentary view of a portion of the apparatus shown in FIGURE 1, and, FIGURE 2 is a graphical representation of plasma density versus fuel drop radius, greatly simplified for ease in explanation and understanding.
Figure 1B:
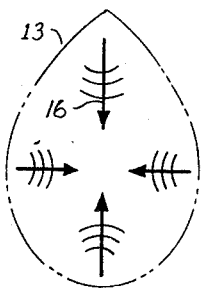
Figure 2:
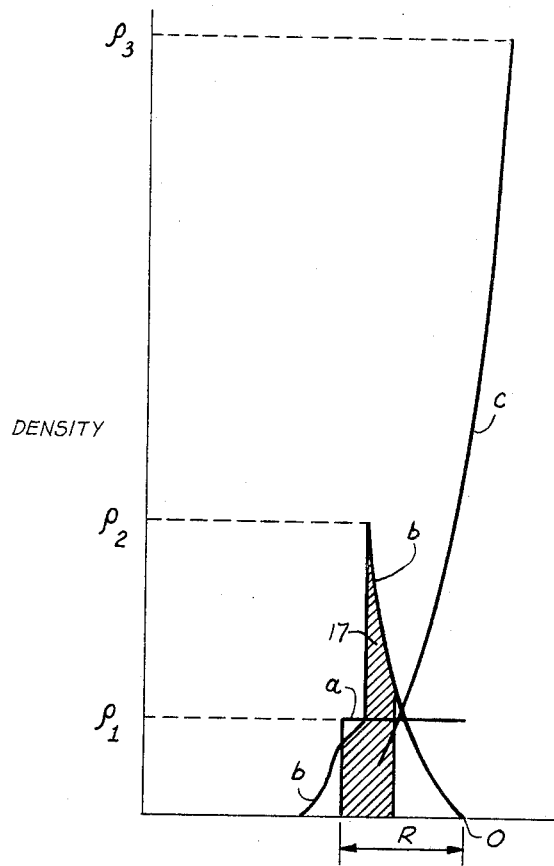

When the drop reaches the central portion of container 10 some of the lasers 11 are fired at an energy level sufficient to produce breakdown at the center of drop 13 and to generate an exploding blast or shock wave 15 shown in FIGURE 1A. The energy required as will be shown later is a very small function of the total energy required to create the implosion; therefore, the actual number of lasers that are fired simultaneously to initiate the blast wave will be a very small number compared to the total number of lasers required. The density profile created by this exploding wave at varying radii of the drop is shown at $b$ in FIGURE 2, whereas the curve $a$ shows the initial constant density of the drop. It is to be noted that $o$ in FIGURE 2 represents the center of the drop and R represents the radius thereof. Thus, after this initial low energy firing the density adjacent the periphery of the drop rises from $\rho_1$ to $\rho_2$ as seen in FIGURE 2. At this point, that is just before the explosive wave leaves the confines of the drop, the remaining lasers are simultaneously fired at high energy levels sufficient to create a strong imploding compression wave shown by arrows 16 in FIGURE 1B. As is apparent the time between firings depends upon the size of the drop and the speed of the blast wave, as will be shown later. The creation of such imploding compression wave at the peripheral region of the drop is due to the fact that it is at this region where the density of the plasma is the greatest as shown by the shaded area 17 in FIGURE 2, it being well known that laser energy absorption depends upon the square of the gas density. As shown in FIGURE 2 the imploding compression wave increases the maximum plasma density from $\rho_2$ to $\rho_3$ as indicated by curve $c$. This density $\rho_3$ is many orders (100) times higher than the density at $\rho_2$ or the initial density at $\rho_1$ which initial density may have been, for example, 1000 atmospheres. These high densities are achieved without creating runaway particles since the particles are sufficiently contained by the imploding wave, which would not be the case with the magnetic-type confiners.

The plasma densities created by the implosion techniques of the present invention are, for example, on the order $10^5$ atmospheres as compared to plasma densities of $10^{-4}$ with magnetic techniques. Translating these values into relative confinement times, it will be seen that the time necessary to sustain a fusion reaction with the present technique is on the order of $10^{-8}$ seconds whereas with the magnetic technique times on the order of ten seconds are necessary. Therefore, more energy is contained within the imploding compression wave which is made available to increase the total energy output of the fusion reaction.

In addition to these very high density increases, a very substantial rise in temperature also occurs due to the implosion. For example, the peak temperature behind the imploding wave may be on the order of fifty times higher than the temperature existing behind the imploding wave when it is initially formed.

The duration times of the low energy and high energy firings are in the order of nanoseconds ($10^{-9}$ seconds) whereas the time that would be necessary for the fuel drop to pass through the center of spherical container 10 is in the order of milliseconds ($10^{-3}$ seconds). Thus, the fuel drop as seen by the laser pulses remains stationary in the center of the container for a very long period of time.

In order to determine the required parameters to practice the above procedure, the following discussion is necessary. On the basis of the considerations of the earlier discussions, the laser generation of a strong implosion in a very pure gas sample is possible. To analytically explain the occurrence of fusion regime temperatures by the implosion technique according to the present invention, the following somewhat simplified analysis is given. According to which analysis, the laser energy is assumed to be added instantaneously to the gas in the region immediately behind the initial exploding blast wave, so that the gas is heated at constant volume. By making this assumption, the calculation of the resulting gas-dynamic motions is greatly simplified. Such an analysis will not include the beneficial effects of photon pressure or plasma motion during heating on the resulting implosion.

If $E_I$ is the laser energy absorbed, $\eta$ the particle density, $A$ the sphere surface area, $d$ the depth of the heated shell, and $T^*$ the temperature of the laser-heated gas, then for the constant-volume assumption one obtains $$(9) \quad E_I = \frac{kT^*}{\gamma - 1} \eta A d$$

When energy is suddenly deposited locally in a gas, the regions of high-energy deposition will expand and wave motion will develop. If the energy is deposited uniformly on a closed surface, one would expect an imploding wave to form inside the surface and an exploding wave outside. In an ideal one-dimensional situation, the resultant initial shock Mach number can be obtained from the usual shock-tube formula $$(10) \quad M_i^2 = \frac{\gamma - 1}{2\gamma} + \frac{\gamma + 1}{2\gamma}(T^*/T_0)\left[1 - \left(\frac{\gamma - 1}{\gamma + 1}\right)\frac{M_i^2 - 1}{M_i(T^*/T_0)^{1/2}}\right]^{2\gamma/\gamma - 1}$$

where $T^*$ is the temperature after the energy is added, $T_0$ is the initial temperature, $\gamma$ is the specific heat ratio. For large Mach numbers and $\gamma = 5/3$, this yields $$(11) \quad M_i^2 = 0.36 T^*/T_0$$

As this shock wave starts to propogate, the initial temperature to which the unheated gas is raised is less than $T^*$. From the Rankine-Hugoniot relations one obtains $$(12) \quad M_i^2 = 3.22 T_i T_0$$

Thus, the initial temperature of the shock-wave-heated driven gas is only $\frac{1}{9}$ of the temperature of the laser-heated driver gas which initiated the imploding shock. The high driver temperature is a consequence of the constant-volume assumption which neglects mass motion of the driver during heating. If such motion were accounted for, the driver temperature required for a given shock strength would not be as great as that required to generate the same shock wave by constant volume energy addition.

The energy required to develop tthe exploding blast wave can be determined as follows:

The shock wave front of a spherical blast wave propagates as $$(13) \quad R_s = A t^{2/5}$$

where $$(14) \quad A^5 = \frac{25 E_{BL}}{16 \pi I_1 \rho}$$

The energy input to the blast wave is $E_{BL}$, the instantaneous radius of the shock wave is $R_s$, the density ahead of the blast wave is $\rho$. The constant $I_1$, is 0.24 for a $\gamma$ of 1.67. The velocity of the shock wave is $$(15) \quad \dot{R}_s = \frac{2}{5} A^{5/2} R_s^{-3/2}$$

For the case of a deuterium-tritium mixture the sound speed is $1.23 \times 10^5$ cm./sec. at 273° K., thus the shock wave velocity can be expressed as a Mach number $$(16) \quad E_{BL} = \frac{(\rho^{1/2} R_s^{3/2} M_s)^2}{1.39}$$

where $\rho$ is now in amagats, $E_{BL}$ in joules, and $R_s$ in cm.

Figure 8:
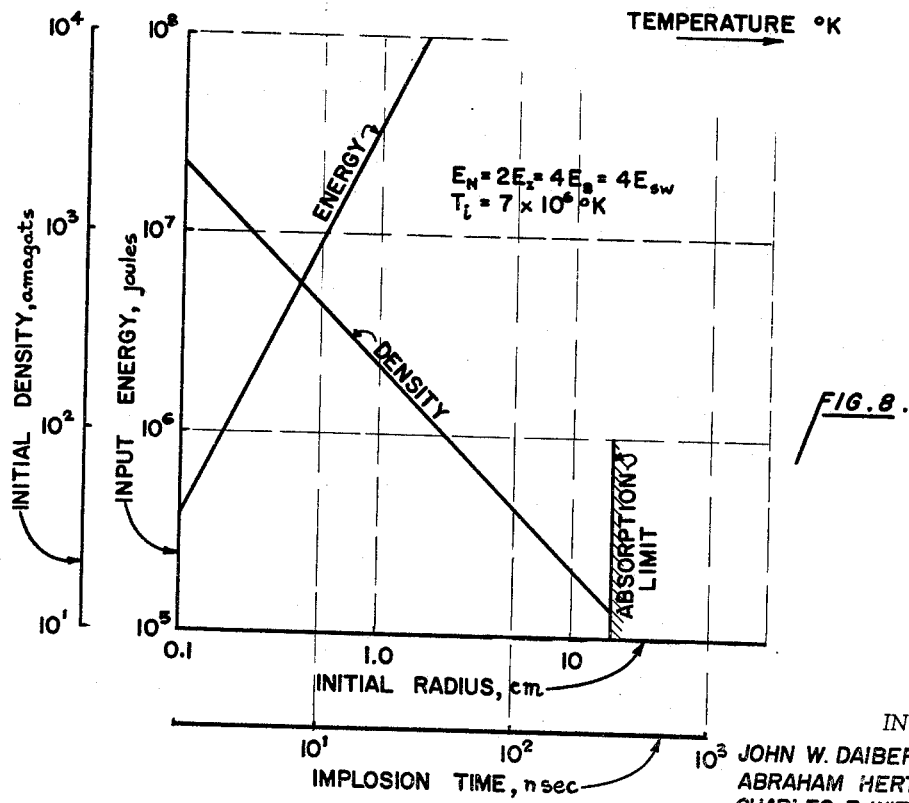
FIGURE 8 is a plot of required energy for a deuterium-tritium gas.

The implosion analysis will indicate that the initial density and radius were related as (Equations 35, 38, and 39 and FIGURE 8, infra)

$$(17) \quad \rho R_s = 204 \text{ cm.—amagats}$$

Therefore the blast wave input energy is $$(18) \quad E_{BL} = 10^2 M_s^2 R_s^2$$

This can be normalized with respect to the energy required to drive the implosion (Equation 36, infra)

$$(19) \quad \frac{E_{BL}}{E_I} = 3 \times 10^{-6} M_s^2$$

Thus the energy invested in the blast wave is always a small part of the total energy.

Figure 4:
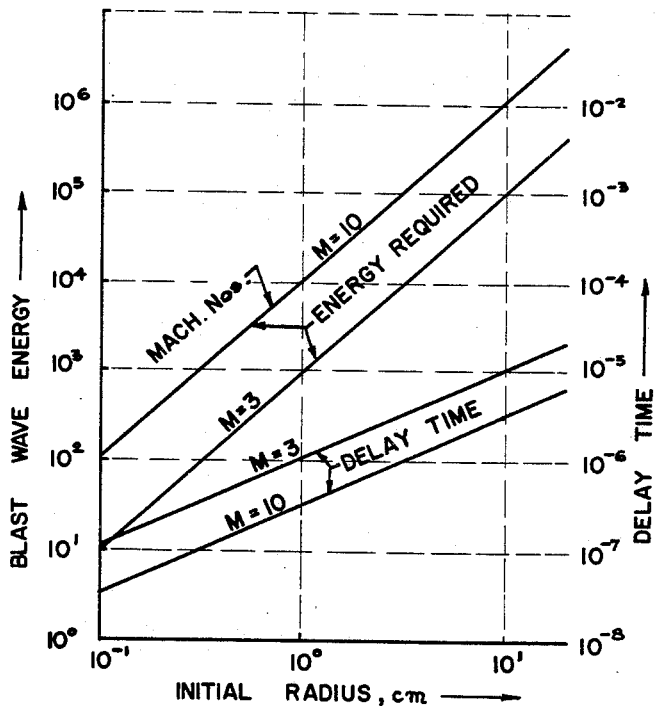
FIGURE 4 is a plot of energy required to generate a blast wave and the delay time between laser firings.

The required strength of the shock wave for the implosion scheme probably lies between 3 and 10. Higher shock wave Mach numbers may be useful for maximizing the density ratio across the shock wave; however, this must be balanced against the greater difficulty in initiating a point explosion. FIGURE 4 shows a plot of the blast wave input energy for various shock wave strengths as a function of the blast wave radius, which is also the initial radius for the implosion.

The time delay between the creation of the blast wave and the initiation of the implosion can be found by integrating the shock wave velocity out to the final radius, $$(20) \quad \tau = \int_0^{R_s} \frac{dr}{\dot{r}} = \frac{2}{5}\frac{R_s}{\dot{R}_s}$$

This delay time is also plotted in FIGURE 4.

Figure 5:
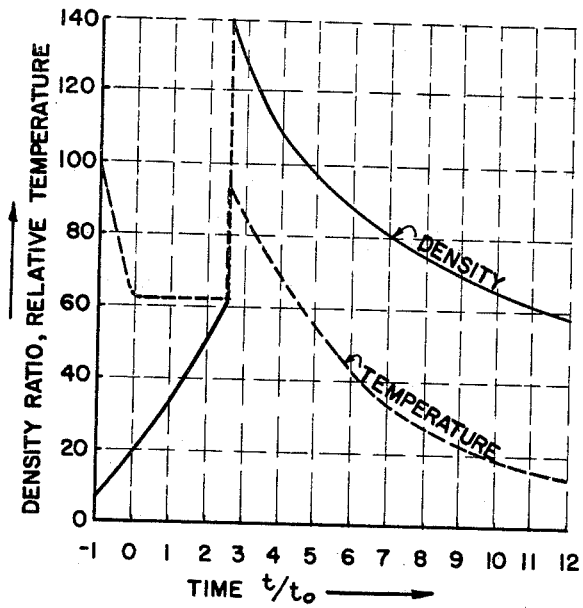
FIGURE 5 is a plot of density and temperature at a fixed location.

The strength of the shock wave calculated with the constant volume assumption has been used with Guderley's similarity solution to determine the subsequent implosion history. Guderley obtained solutions for both spherical and cylindrical shock waves for an ideal gas having $\gamma = 7/5$. The time variation of temperature and density at any fixed location from the origin are shown in FIGURE 5 for a spherical shock wave. The time scale used by Guderley is the time required for the shock wave to go from the radius of interest to the origin. By assuming that the shock radius varies as time to some power, he determined that the pressure immediately behind the shock wave varies as $R_s^{-0.792}$. The pressure variation for a monatomic gas was found by Chisnell (see for example, Journal of Fluid Mechanics, vol. 2, page 286) to be $R_s^{-0.902}$. The characteristic time for implosion $t_0$ is thus $$(21) \quad t_0 = -\int_{r_0}^{0} \frac{dR_s}{U_s} = 5.17 \times 10^{-5} r_0 T_i^{-1/2}$$

where:

$R_s$ is imploding blast wave radius
$U_s$ is shock wave velocity, cm./sec.

for $\gamma = 5/3$ and a molecular weight of 2.5, which is the average weight for a monatomic gas composed of 50 percent deuterium and 50 percent tritium.

A most significant feature of the results shown in FIGURE 5 is the density behavior. It is noted that the density at a fixed location continuously increases from the time the imploding shock passes the point ($t/t_0 = -1$) until the reflected shock arrives at that point and reaches a maximum value of 140 times the initial density immediately behind the reflected shock. This density amplification is important since it greatly increases the collision rate of the hydrogen nuclei and will thus increase the thermonuclear reaction rates.

The energy added by the laser has already been given and can be written by combining Equations 10 and 11 and using Loschmidt's No. $\eta=2.69\times10^{19}\rho$ as $$(22) \quad E_I=3.50\times10^{-10}r_0^2U_1^2\rho_1^*d$$

To determine the total amount of laser energy which is required to initiate the implosion, the depth of the driver $d$ needs to be determined. This depth can be found by making a detailed wave diagram that includes the driver gas and the starting expansion wave. For the purpose of the present discussion such a detailed analysis is not warranted, since by equating the required input energy to the energy added by the shock wave to the gas, a reasonable approximation to the driver depth can be obtained. The discrepancies, if any, will relate only to the quality of the fusion reaction and not to the feasibility thereof.

The energy given by the imploding shock wave to the gas is $$(23) \quad E_{sw}=\rho_{st}\int_{t_0}^0 2\left(\frac{2U_s}{\gamma+1}\right)^2\rho_0^*U_s4\pi R_s^2 dt$$

where $U_s$ is the shock velocity, $R_s$ is the shock radius, $\rho_0^*$ is the average density into which the imploding shock wave is propagating, $\rho_{ST}$ is the mass density of the gas in gm./cm.$^3$ at standard conditions. This integral can be evaluated using Guderley's solution, which gives $$(24) \quad E_{sw}=7.50\times10^{-11}r_0^3U_1^2\rho_0^*$$

for a molecular weight of 2.5 and $\gamma=5/3$. Dividing these expressions, one obtains $$(25) \quad \frac{E_I}{E_{sw}}=s(d/r_0)(\rho_1^*/\rho_0^*)$$

This equation as well as the following equation for bremsstrahlung and thermonuclear energy outputs will be combined (infra) to obtain the predicted results for a laser-driven imploder.

The rate of energy radiation loss per unit volume by electrons in free-free collisions with hydrogen ions is $$(26) \quad P_B=1.42\times10^{-34}\eta^2T^{1/2}$$

and the rate of energy release per unit volume by fusion reactions is $$(27) \quad P_N=E_R\overline{\sigma v}\eta^2$$

where $\sigma$ is the cross section, $v$ is the particle velocity, and $E_R$ is the energy release per reaction ($1.41\times10^{-12}$ joules for deuterium-tritium). To evaluate the energy outputs, these expressions must be integrated over the plasma volume for the duration of the confinement.

By assuming that the energy output can be decoupled from the gas dynamics of the implosion, the integrals have been evaluated over the volume between the shock wave and the interface and for the time corresponding to a change in radius from the initial value $r_0$ to 1 percent of that value. The contribution of the laser-heated driver gas has been neglected in calculating both energy outputs, as has any increase in dwell time resulting from bringing the interface separating driver and driven gases to rest by the reflected shock wave. As will be appreciated by those skilled in the art where the approximations recited in the present analysis result in discrepancies, these will affect only the nature of the fusion reaction.

The variation of temperature and density throughout this volume was found from Guderley's solution. This computation required the assumption of a diatomic gas, since the solution for the temperature and density distribution behind the shock wave is available only for this case. Instead of solving the similarity equations for a monatomic gas, it was assumed that the variation would be the same as for a diatomic gas and that the absolute values could be scaled according to the Rankine-Hugoniot relations across the shock wave. By doing this, the stronger shock wave acceleration for the monatomic case has been neglected. Consequently, the shock wave Mach number near the origin is underestimated which will result in lower temperatures being used for the numerical integration. As a consequence of this, even less input energy is required.

From Equation 26 it can be seen that the total bremsstrahlung energy loss varies directly as initial radius cubed, initial density squared, temperature to the one-half power and the implosion time. According to Guderley's solution, the characteristic time for the implosion varies directly as the initial radius and inversely as the square-root of temperature. Thus, the radiative loss is independent of temperature. The proportionality constant was determined from the numerical integration and corrected to $\gamma=5/3$ $$(28) \quad E_B=450r_0^4\rho_0^{*2}$$

Figure 6:
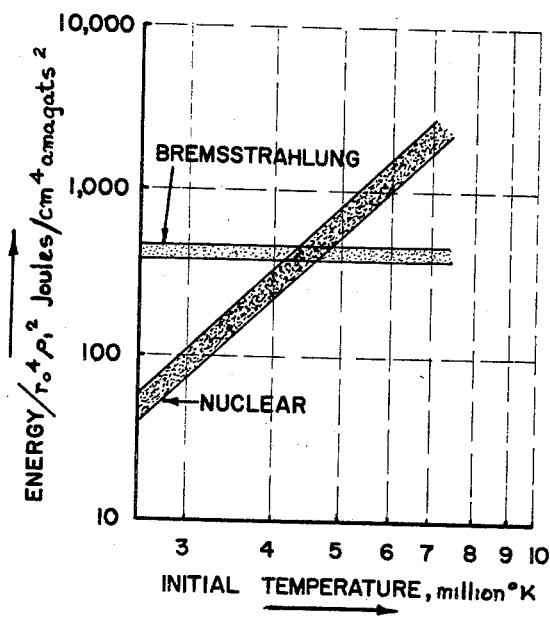
FIGURE 6 is a plot of energy output from a spherical imploding shock wave in a deuterium-tritium plasma.

The result is plotted in FIGURE 6.

Figure 7:
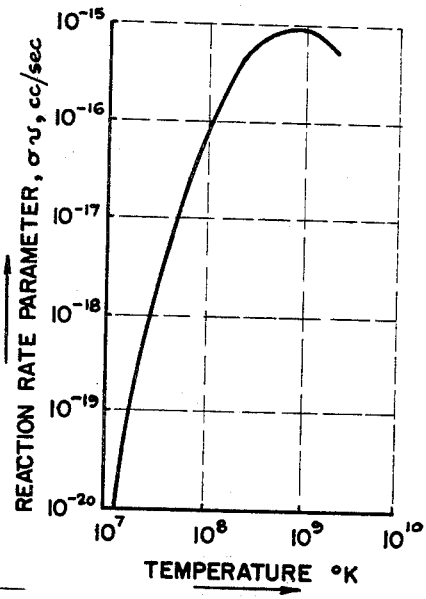
FIGURE 7 is a plot of reaction rate parameter for a Maxweillian particle distribution.

The reaction-rate parameter $\overline{\sigma v}$ used in determining the nuclear energy output is shown in FIGURE 7. As can be seen, this does not have a simple square-root temperature dependency; consequently, the nuclear energy output will depend on the initial temperature. The results of the integration are shown in FIGURE 6. Over the range of interest, the data can be fitted by $$(29) \quad E_N=0.8\times10^{-24}T_i^4r_0^4\rho_0^{*2}, \quad (\gamma=5/3)$$

The important equations which have been derived will now the summarized. There are:

$$(30) \quad E_I=7.0\times10^{-3}T^*r_0^2\rho_1^*d$$

Bremsstrahlung energy loss $$(31) \quad E_B=450r_0^4\rho_0^{*2}$$

Nuclear energy output $$(32) \quad E_N=0.8\times10^{-24}T_i^4r_0^4\rho_0^{*2}$$

By combining these equations with the relation for energy balance $$(33) \quad \frac{E_I}{E_{SW}}=S(\rho_1^*/\rho_0^*)(d/r_0)$$

and for a constant volume heated shock tube driver $T^*/T_i=9$ we obtain the result that $$(34) \quad T_i=4.86\times10^6(E_N/E_B)^{1/4}$$

$$(35) \quad r_0\rho_0^*=145(E_I/E_{SW})(E_N/E_I)/(E_N/E_B)^{3/4}$$

$$(36) \quad E_I=9.72\times10^6(E_I/E_{SW})^2(E_N/E_I)r_0^2/(E_N/E_B)^{1/2}$$

The results of this analysis are in approximate agreement with Lawson's criterion (see for example, Preceedings of Physics Society B, vol. 70, page 6) that the product of particle density and confinement time must exceed $10^{14}$. This can be seen by taking the implosion time as $2.34\times10^{-8}$ $$r_0\left(\frac{E_N}{E_B}\right)^{-1/8}$$

then one obtains $$(37) \quad \eta t_0=0.85\times10^{14}(E_I/E_{SW})(E_N/E_I)(E_N/E_B)^{-7/8}$$

which agrees with Lawson's result when reasonable values for the parameters are used.

The determine the scale of the system, let the nuclear energy output be twice the laser energy input which, in turn, is twice the bremsstrahling loss $$(38) \quad E_N/E_I=2$$

$$(39) \quad \frac{E_N}{E_B}=4$$

Since an exploding, as well as an imploding, shock wave will be developed, let $E_I$ be twice $E_{SW}$.

By substitution into the previous equations the required initial temperature behind the imploding shock wave is found to be $7 \times 10^{6}$° K. for a deuterium-tritium gas mixture. The required input energy and the initial density as a function of the initial shock-wave radius are shown in FIGURE 8 for this particular initial temperature. Also shown on an auxiliary scale is the time required for the shock wave to implode according to Guderley's solution. As would be expected, the required input energy decreases as the initial radius gets smaller. The radius for which the required temperature of the laser-heater gas is less than the maximum temperature to which the stationary plasma can be heated before becoming transparent is indicated by the absorption limit near 10 cm.

Even though the energy to be used to drive the implosion is much greater than that used to create the blast wave, one might argue that all the energy would go into amplifying the blast wave and none into creating a second imploding shock wave. However, this has not been found to be the case and for the purpose of attempting to explain analytically why the implosion occurs a perturbation analysis of the flow behind a shock wave undergoing radiative energy addition has been made. For calculation simplicity the analysis has been limited to the one-dimensional case where, prior to the energy addition, the flow properties preceding and behind the shock wave are constant and to the assumption that the intensity of the incident radiation is constant. The calculation could be extended to spherically symmetric geometry and to time-dependent energy addition. However, while such extensions would change the details of the calculation, the qualitative results would be the same and little additional understanding would be gained from the more elaborate effort.

The analysis utilizes the "PLK method" or the "method of strained coordinates" to calculate the deviation of the characteristics due to energy addition in the region behind the primary shock wave. It is assumed that the incident radiation is essentially monochromatic, that the intensity is small and that this intensity attenuates according to a Beer's law in its direction of propagation after penetration of the primary shock wave.

From the analysis one finds that a secondary shock wave would be generated by the radiative energy addition. Furthermore, one finds that this secondary shock wave can face in a direction opposite to that of the primary shock wave; i.e., the mass flow through this shock wave is in the direction opposite to that of the primary shock wave. Thus this analysis indicates that imploding shock waves are generated behind an exploding shock wave by laser energy addition.

In addition to the very high densities produced by the imploding shock wave, it will be clear that the plasma produced is perfectly pure since the drop does not come into contact with anything except the laser radiation which is obviously not capable of contaminating it.

From the foregoing, it will be seen that the inventive method creates a controlled nuclear fusion reaction by energizing the central area of a body of fusion fuel at a first energy level such that an exploding shock wave emanates therefrom and thereafter energizing such body of fuel at a second energy level such that an imploding compression wave is created adjacent the exploding wave whereby a sustained nuclear fusion reaction occurs downstream of such imploding compression wave.

The energy created by the method of the present invention can be converted into a more usable form by various means, as for example, heat transfer between the spherical container and a fluid that would be placed adjacent thereto. Alternatively, the spherical chamber could be tapped to permit a flow of charged particles for direct conversion into electrical energy.

While a preferred manner of carrying out the present invention has been described, other modifications will become apparent to those skilled in the art. It is therefore intended that the invention is to be limited only by the scope of the appended claims.

We claim:
1. In a method of creating a controlled nuclear fusion reaction, the steps comprising;
   (a) firing a first beam of coherent radiation at the central area of a body of fusion fuel at a first energy level such that an exploding shock wave emanates therefrom, said first energy level being susbtantially at least

$$E_{BL} = \left( \frac{\rho^{1/2} R_s^{3/2} M_s}{1.39} \right)^2$$

where, $E_{BL}$ is said first energy level in joules,
$\rho$ is the initial density of said fuel drop in amagats,
$R_s$ is the radius of said fuel drop in cm.,
$M_s$ is the Mach No. of said shock wave at $R_s$, and
   (b) firing a second beam of coherent radiation at said fuel at a second energy level such that an imploding compression wave is created adjacent said exploding wave whereby a sustained nuclear fusion reaction occurs downstream of said imploding compression wave, said second energy level being greater than $$E_I = \frac{kT^*}{\gamma - 1} \eta A d$$

where, $E_I$ is said second energy level in joules,
$k$ is Boltzmann constant, $1.38 \times 10^{-16}$ ergs/degree K.
$T^*$ is the temperature in degrees K. of said fuel drop after said second energy is added thereto,
$\gamma$ is the specific heat ratio,
$\eta$ is the ion particle density in cm.$^{-3}$ of said fuel drop, and
$Ad$ is the volume of said fuel drop in cm.$^3$ and wherein,
   (c) said second firing occurs substantially $\tau$ seconds after said first firing, where, $$\tau = \int_0^{R_s} \frac{dr}{\dot{r}}$$

where, $R_s$ is the radius of said fuel drop in cm.,
$r$ is the instantaneous radius of said shock wave, and
$\dot{r}$ is the velocity of said shock wave at $r$, (d) the energy released from said fusion reaction being adapted to be converted into a more usable form.

2. The method according to claim 1 wherein said second beam is fired just before said exploding shock wave emerges from the confines of said drop.

3. The method according to claim 2 wherein said beams are arranged such that when energized the entire solid angle of a central portion of said drop is filled with radiant energy.

4. The method according to claim 1 wherein said drop of fusion fuel is introduced into an evacuated reaction chamber.

References Cited

UNITED STATES PATENTS 3,094,474   6/1963   Gale _____ 176—1

OTHER REFERENCES

E. B. Rechsteiner and R. L. Saxe, Masers and Lasers, a New Market With Enormous Growth Potential, pub. by Technology Markets, Inc., 509 5th Ave., New York, N.Y. 10017, p. 57, May 23, 1962.

The Physics of Fluids, vol. 7, No. 7, July 1964, pp. 981–987.

REUBEN EPSTEIN, Primary Examiner